US009092515B2

(12) United States Patent
Partanen et al.

(10) Patent No.: US 9,092,515 B2
(45) Date of Patent: Jul. 28, 2015

(54) METHOD, A COMPUTER SYSTEM AND A COMPUTER READABLE MEDIUM FOR QUERYING OBJECTS BY MEANS OF METADATA (75) Inventors: Timo Partanen, Lempäälä (FI); Juha Lepola, Tampere (FI)

(73) Assignee: M-FILES OY, Tampere (FI)

( * ) Notice: Subject to any disclaimer, the term of this patent is extended or adjusted under 35 U.S.C. 154(b) by 374 days.

(21) Appl. No.: 12/803,741

(22) Filed: Jul. 2, 2010

(65) Prior Publication Data

US 2012/0005194 A1  Jan. 5, 2012

(51) Int. Cl.
*G06F 17/30* (2006.01)

(52) U.S. Cl.
CPC ................. *G06F 17/30722* (2013.01)

(58) Field of Classification Search
CPC ............... G06Q 30/0269; G06F 17/30424; G06F 17/30106; G06F 17/30386; G06F 17/30; G06F 17/30011; G06F 17/30091; G06F 17/30289
See application file for complete search history.

(56) References Cited

U.S. PATENT DOCUMENTS

| 6,732,109 | B2 * | 5/2004 | Lindberg et al. ............... 707/797 |
| 2007/0239702 | A1 * | 10/2007 | Vassilvitskii et al. ............ 707/5 |
| 2010/0106729 | A1 * | 4/2010 | Pan et al. ....................... 707/747 |

OTHER PUBLICATIONS

"Chapter 21: Object Database Standards, Languages and Design"; In: Elmasri R. and Navathe S.B: "Fundamentals of Database Systems Fourth Edition"; 2004, Pearson, Addison-Wesley, Boston et al; pp. 665-699, Chapter 21.3: The Object Query Language OQL figures 21.5, 21.6.
E. Bertino, et al; "Object-Oriented Database Management Systems: Concepts and Issues"; Computer, IEEE Service Center, Los Alamitos, CA, US; vol. 24, No. 4, Apr. 1, 1991; pp. 33-47, Abstract.

* cited by examiner

*Primary Examiner* — Yuk Ting Choi
(74) *Attorney, Agent, or Firm* — Ware, Fressola, Maguire & Barber LLP (57) ABSTRACT

This invention concerns a method for a computer system, a computer system and a computer readable medium. The computer system stores electronic objects being defined by metadata. The method comprises at least retrieving objects based on metadata of the metadata of the object.

13 Claims, 7 Drawing Sheets

METHOD, A COMPUTER SYSTEM AND A COMPUTER READABLE MEDIUM FOR QUERYING OBJECTS BY MEANS OF METADATA

FIELD OF THE INVENTION

The present application relates to computer systems and to retrieval of objects by means of metadata queries.

BACKGROUND OF THE INVENTION

Content management systems (CMS), document management systems (DMS) and data management systems refer to systems for managing electronic documents. In the present disclosure the term "document management system" is a general term referring also to content and data management systems. Such systems comprise various features for managing electronic documents, e.g. storing, versioning, indexing, searching for and retrieval of documents. It is appreciated that there are both dynamic and static document management systems. The difference between dynamic and static systems is the way they store files. In the static systems files are stored e.g. in a constant treelike hierarchy that defines relationships for folders and documents stored in the tree. In the dynamic systems the files may be given identifications that define their existence in the system. The location of the files is not constant, but may vary in a virtual space depending on the situation.

Figure 1:
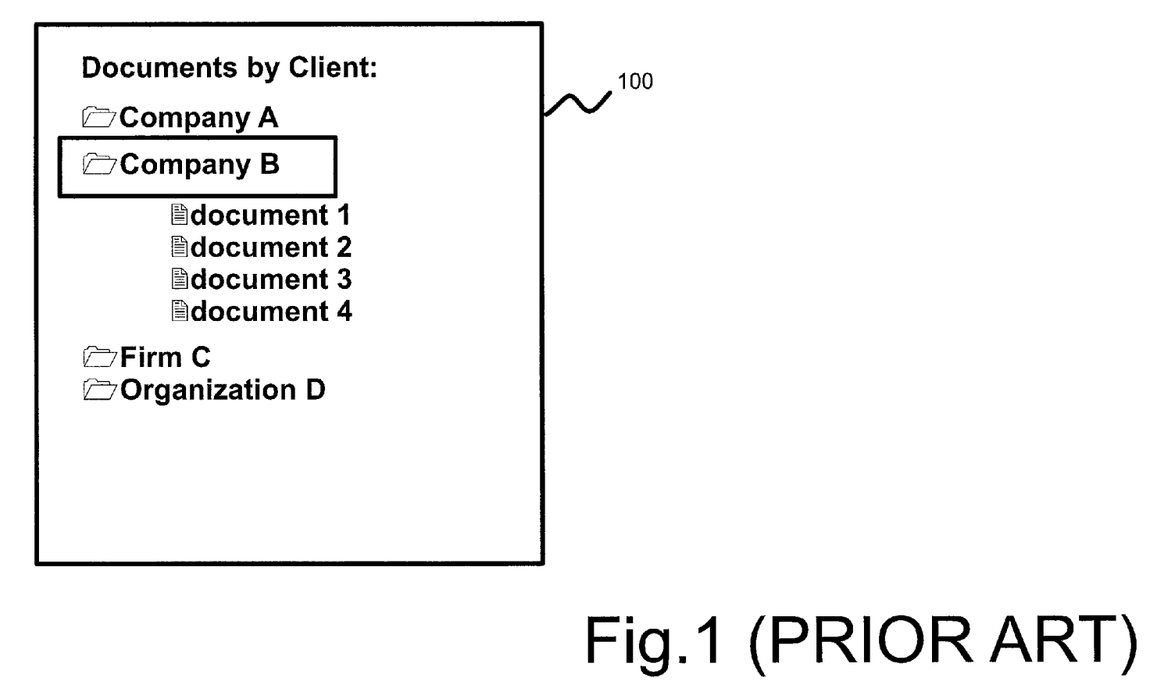
FIG. 1 illustrates an example of a view listing documents by direct metadata according to prior art.

In a dynamic document management system, virtual folders are used for enabling browsing of documents (i.e. objects). When a folder hierarchy is navigated, virtual folders comprising documents matching the conditions of the previous levels are dynamically formed. Virtual folders are based on the metadata of the objects (i.e. information on a objects' properties). An example of this is shown in FIG. 1. For example, a user interface view "Documents by Client" 100 shows virtual folders on the basis of the Client property of the documents: "CompanyA", "CompanyB", "FirmC", "OrganizationD" etc. To put it more clear, the documents are listed in a client-specific manner so that when a user selects e.g. "Company B", s/he is shown a list of documents having "Company B" as their Client property. This is called a direct reference or direct metadata.

It has been realized in this technical field that more versatile and more effective method is needed for querying documents and for forming virtual folders. This invention is addressed to such a need.

SUMMARY OF THE INVENTION

The aim of the present solution is to enable indirect reference in addition to the direct reference. This means that in addition to the direct metadata, queries based on indirect metadata are possible. Such a solution enables more extensive queries and browsing in the virtual space.

This aim is achieved by a method, a computer system and a computer readable medium.

An example of a method for a computer system storing electronic objects being defined by metadata comprises at least retrieving objects based on metadata of the metadata of the object.

In another example of the method, objects are retrieved as a response to query of objects.

Yet another example of the method further comprises utilizing the retrieved objects for navigation in a virtual space.

Yet another example of the method further comprises forming virtual folders for retrieved objects.

Yet another example of the method further comprises retrieving objects by referring the metadata of more than one object chained one after the other.

In yet another example of the method, the metadata comprises one or more pieces of metadata.

In yet another example of the method, wherein the metadata of the object is an object.

An example of a computer system configured to store electronic objects being defined by metadata, comprises at least retrieving means (unit) for retrieving objects based on metadata of the metadata of the object, In another example of the computer system the retrieving means (unit) are configured to retrieve objects as a response to query of objects.

Yet another example of the computer system is configured to utilize the retrieved objects for navigation in a virtual space.

Yet another example of the computer system further comprises forming means for virtual folders for retrieved objects.

Yet another example of the computer system is further configured to retrieve objects by referring the metadata of more than one object chained one after the other.

In yet another example of the computer system, the metadata comprises one or more pieces of metadata.

In yet another example of the computer system, the metadata of the object is an object.

In an example of a computer readable medium comprising computer program instructions stored thereon, the instructions when executed are for retrieving objects based on metadata of the metadata of the object.

Thanks to the present solution, the virtual folder arrangement and the navigation in such become more effective and productive. Documents can be retrieved by referring them indirectly which makes browsing in virtual space more extensive. By the present indirect reference, more complex queries can be performed and still well arranged folder views can be provided.

In addition, by the present solution each object can have its own relevant metadata and the metadata does not need to be duplicated throughout the objects. The present solution therefore makes it possible to have all the metadata of the system available for queries and navigation without a need for storing all the metadata for all objects.

DESCRIPTION OF THE DRAWINGS

The invention is described in more detailed manner by means of the following disclosure and the drawings, where.

DETAILED DESCRIPTION OF THE INVENTION

Figure 2:
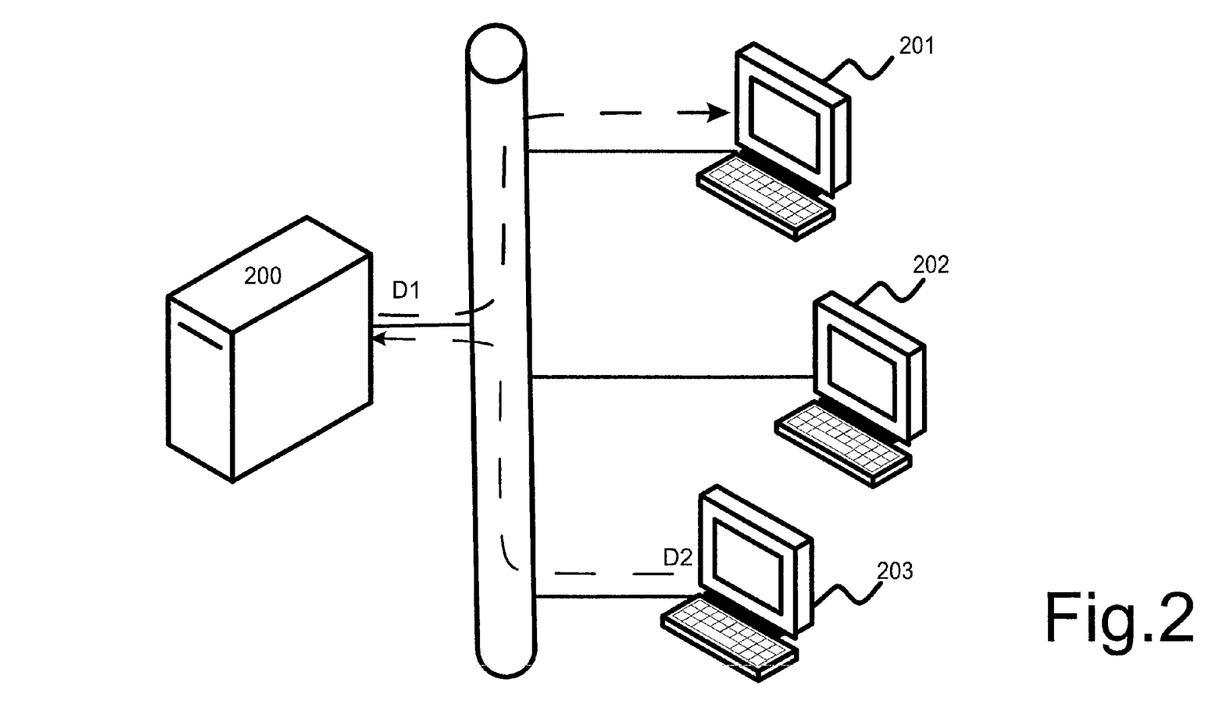
FIG. 2 illustrates an example of a document management system.

FIG. 2 illustrates an example configuration of a document management system. In this disclosure, the term "document management system" is used for describing both "document management systems" as such, but also "content management systems" or "data management systems". The document management system comprises the document management server 200 and client devices 201, 202, 203, which are all interconnected. The interconnection can be wired or wireless and it may be substantially always on or it may be disconnected occasionally. The server 200 is configured to store documents that can be retrieved by the client devices 201, 202, 203. For example, in FIG. 2 document D1 is retrieved by the client device 201, whereas document D2 is stored by the client device 203 to the document management server 200. The document management server 200 is configured mainly to store documents, but in use the document management server may have other functions as well, e.g. it controls access rights, registers modifications made to documents and allows connections to other systems. The server comprises at least one processor 22, with at least one computer readable medium 222 for the storage of at least computer program code for execution by the processor to perform the functions discussed herein.

In the present disclosure term "object" is a concept for the document management system. The object has metadata and sometimes also files. A document, a client and a project are examples of an object. The document is an electronic file which on the other hand relates to a medium that has been created by a certain application. For example, a piece of text created by using the Microsoft Word application is a file. "Metadata" refers to information on object's properties. Metadata is composed of two parts—a definition part and a content part. The definition part defines generally the type of property; client, project, customer, creator, date, etc. The content part on the other hand specifies the value of the metadata, i.e. which client ("WoodChoppers Ltd"), which project ("Christmas trees"), which customer ("Tree store"), which creator ("John Leaderman"), which date ("Dec. 01, 2010"). For further example, specified values for a creator of the file or a creation date represent content of the metadata. In addition, a project which the document belongs to; a client who owns the document; a type of the document (letter, assignment, publication, order etc.); name of the document are examples of the content of metadata. Despite the plural form of metadata, in this disclosure, the term metadata may also refer to a singular form. Therefore, an object being defined by "metadata" may in practice be defined by one or more pieces of metadata.

In the present disclosure, term "property—properties" is used as a synonym for metadata.

Figure 3:
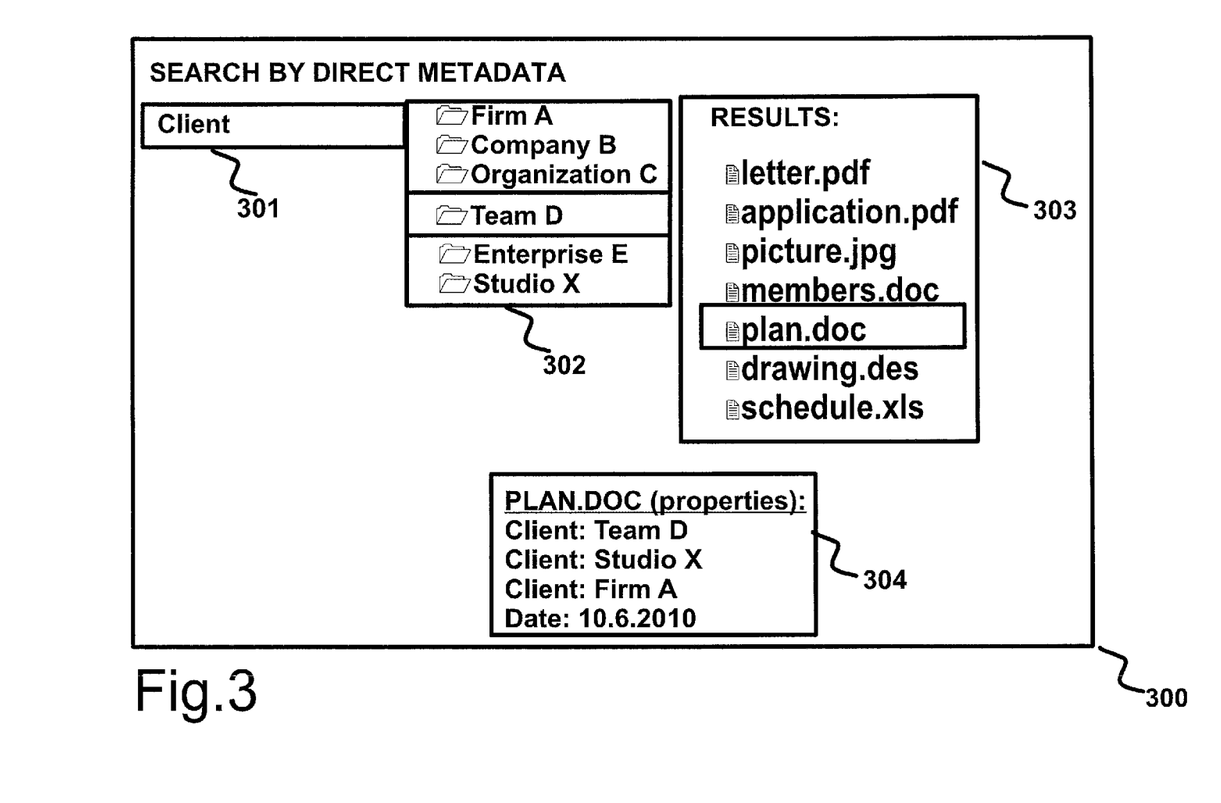
FIG. 3 illustrates an example of a query based on direct metadata.
Figure 4:
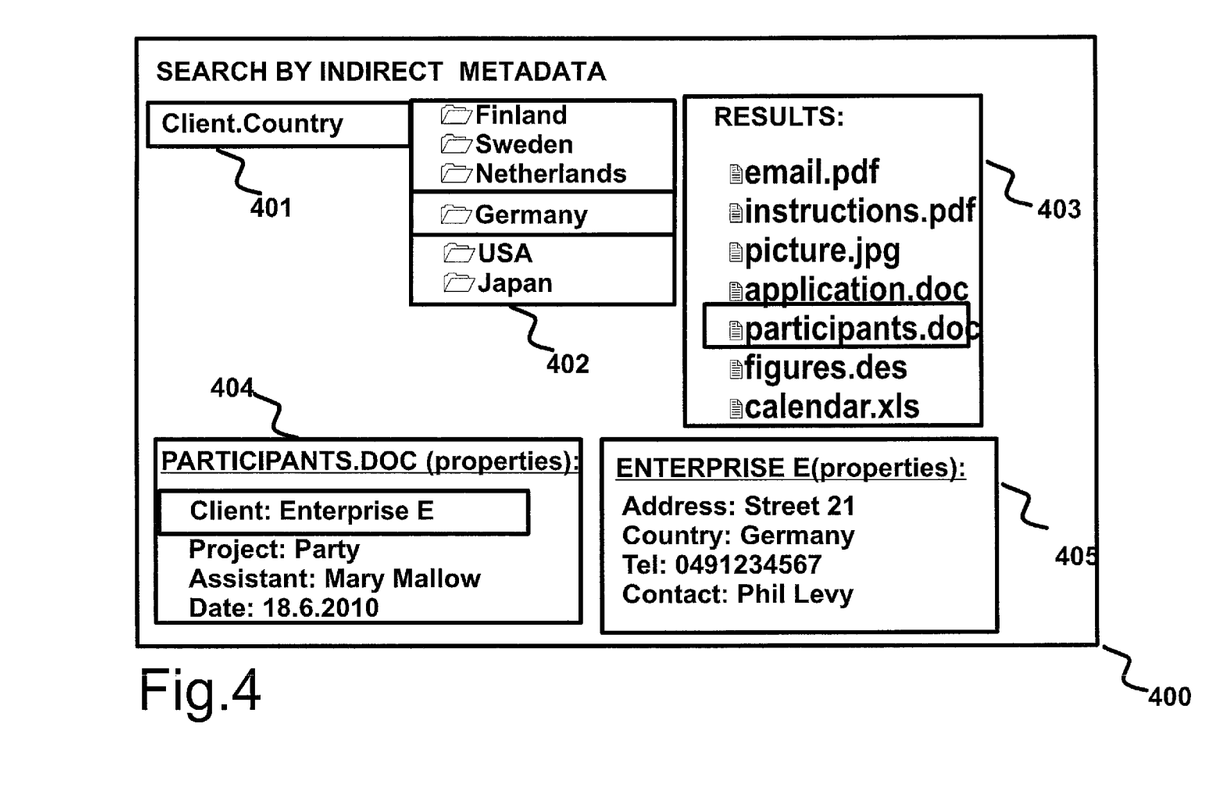
FIG. 4 illustrates an example of a query based on indirect metadata.
Figure 5:
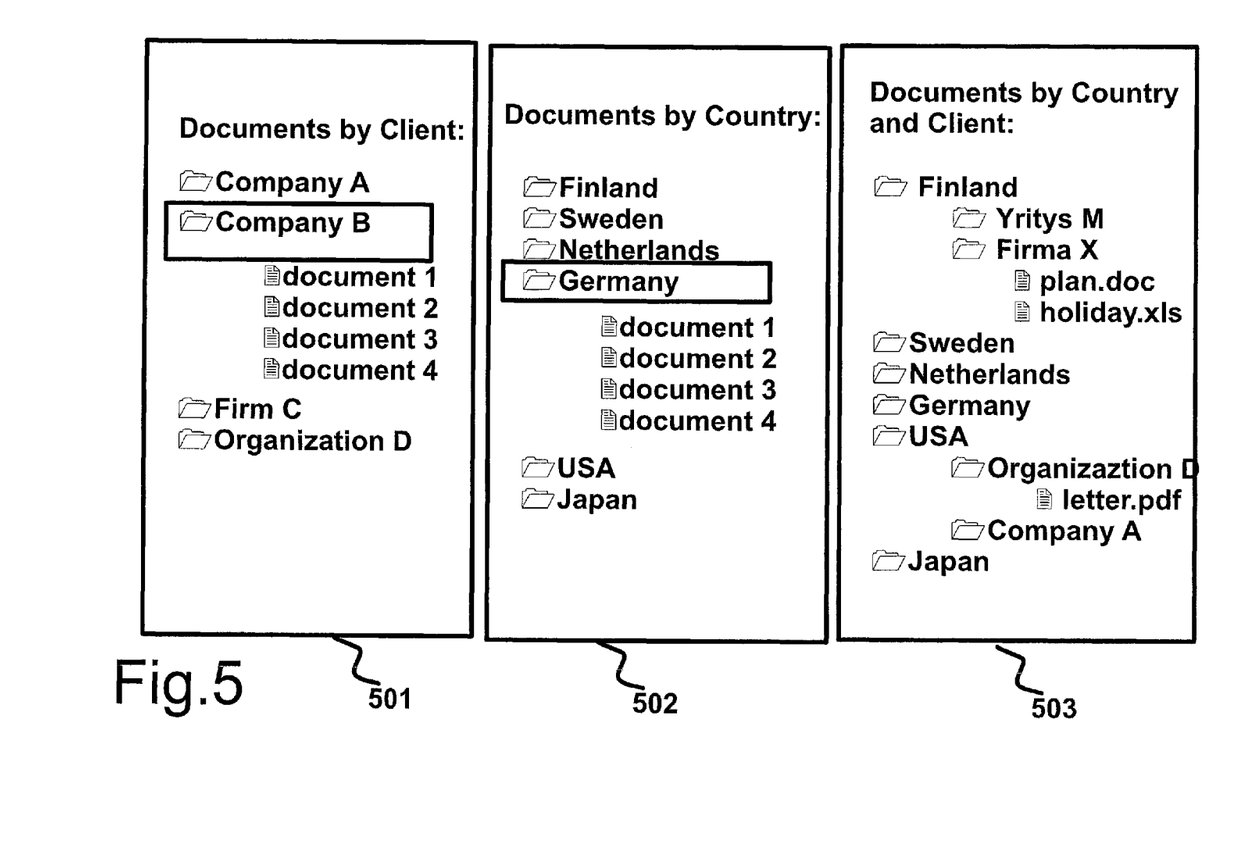
FIG. 5 illustrates examples of views for folder navigation.

The documents may be retrieved by means of direct metadata, as was discussed in the background portion of this disclosure. This means that the document management system lists each document that comprises queried data as its metadata. A further example of this is shown in FIG. 3. It is appreciated that all the user interface views shown in FIGS. 3-5 are simplified examples, and therefore the skilled person understands that any deviation from those is possible. In FIG. 3, the user wishes to list all the documents that have a certain content (i.e. value) in their metadata. In the user interface view 300, the user defines that s/he wishes to find documents that have "Team D" as their Client property. In order to do that, the user first defines "Client" as the desired metadata in the search field 301. After this, the user can be shown a drop-down menu 302 comprising all the possible clients, wherefrom the user can select "Team D". It is appreciated that instead of selecting "Team D" from the drop-down menu, the user may also type the client's name. Similarly, instead of typing "Client" into the search field 301, the user may be shown a drop-down menu comprising all the possible properties that can be selected.

Now, the user has defined that s/he wishes to have a document listing comprising documents that have "Team D" written into their Client property. Result window 303 then retrieves all such documents from the virtual space. In addition or optionally all the resulted documents can be directly printed to paper or similar, and thus result window 303 is not necessarily needed. It should be noticed that any document shown in the result window 303 may also have other Client properties. For example, "plan.doc" may have three Client properties as shown by a window 304: one for "Team D", one for "Studio X" and one for "Firm A".

However, sometimes it is desirable to search objects by means of indirect metadata. This means that e.g. document listing is performed by—not document's metadata but—document's metadata's metadata. Yet in other words, the retrieval of documents is performed by referring metadata of the metadata of the documents. For example, let us assume that Country is not a property of a document, but a property of a client. Now, the user wishes to search "Documents by Country", e.g. defining that s/he wants to have such documents listed the clients of which are from "Germany". Earlier, this kind of listing has been problematic because Country is not a direct property of a document, but a property of a client (which in turn is a property of the document).

In addition, there is a need for forming virtual folders based on indirect metadata. Because virtual folders can typically be constructed from direct metadata only (as shown in FIGS. 1 and 3), document listing in country-specific virtual folder has not previously been possible.

By the present solution users are enabled to use indirect properties of documents as the basis of search criteria of virtual folders and thus to view e.g. "Documents by Country" even if the document's metadata does not include the Country property. The Country data can be retrieved indirectly from e.g. the clients' metadata, as shown in FIG. 4. In the example of FIG. 4, the user desires listing of documents by country. In order to do that, the user types "Client.Country" in the search field 401. Instead of typing, the user may select the "Client.Country" from e.g. a drop-down menu or the user can be offered other kind of selection methods. Similarly, specification "Client.Country" is only an example, and the reference path can be composed differently.

After defining the rules for listing (i.e. documents by country, i.e. "Client.Country"), the user is shown a drop-down menu 402 of all the possible countries. The user selects "Germany" from the drop-down menu 402, and the result window 403 lists all the documents that has such a client in their Client property whose Country property is "Germany". It is to be noticed that if a certain document had a Country property and "Germany" defined therein, such a document would not be listed in the result window 403 (unless its client would have a "Germany"-property also). This can be further realized from FIG. 4. When the user selects a document "participants.doc" from the result window 403, s/he notices that the document comprises a Client property, a Project property, an Assistant property and a Date property. When the user further selects the Client property to see the properties (405) of "Enterprise E", s/he finds the Country property, i.e. "Germany".

The examples 3 and 4 have been related to document queries. However, the present solution is also applicable in folder navigation (the example of which is shown in FIG. 1) and forming virtual folders by means of indirect metadata and displaying the formed folder arrangement. An example of folder browsing (i.e. navigation) is shown in FIG. 5. View 501 shows a navigation with direct metadata "Documents by Client". The documents are listed by a direct reference "Client". The present solution also enables forming a view 502 which directly lists "Documents by Country" even though Country cannot be used as a direct reference because of it not being metadata of the document. The system forms "Client.Country" in order to reach such documents. View 503 further lists "Documents by Country and Client" (reference path: "Client.Country" AND "Client"). This view further classifies documents within country folders according to their client. In these views, virtual folders are formed at the time the user navigates through the folder hierarchy. This means that every level of the navigation depends on the previous levels so that the previous levels define conditions for the following level. This kind of solution enables categorizing documents, forming folder views and grouping data in completely novel way.

In the previous examples, the virtual folders are formed (either by the user or the system) by specification "Client.Country" the idea of which is to define a grouping level in the virtual folder arrangement so that the right-most term defines the basis for the listing, and the terms before it define the path for reaching it. The left-most term(s) therefore defines via which metadata of the present object, the desired metadata can be reached. The skilled person will appreciate that there are no limits in the chain of indirect references and therefore the present solution also enables further indirection e.g. "Project.Client.Country". In further indirection, objects are retrieved by referring the metadata of more than one object one after the other. It is to be noticed, that each metadata before the desired metadata needs to be an object of the system. It is also appreciated that depending on the situation and the use case, the reference to metadata may be a reference to a content part of the metadata or a definition part of the metadata.

Figure 6:
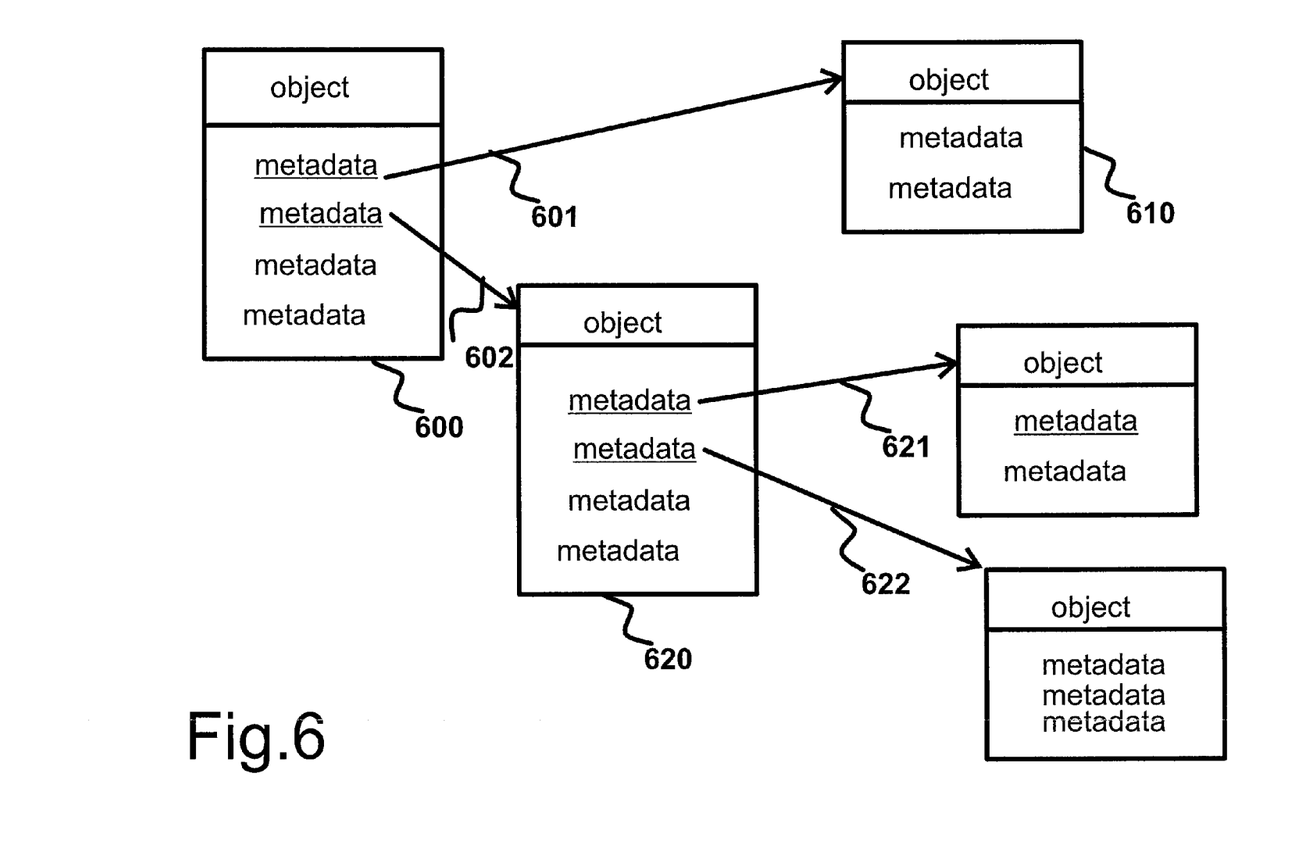
FIG. 6 illustrates an example of relationships between objects via metadata.

In FIG. 6 an object 600 is defined by means of metadata. The underlined pieces of metadata of the object 600 are also objects, whereby an indirect reference (601, 602) via them is possible. It can be seen from FIG. 6 that object 610 comprises metadata that is not an object, and therefore referral via that is not possible. However, object 620 is also defined by metadata, where the underlined pieces of metadata are also objects and can be used for indirect reference (621, 622).

Figure 7:
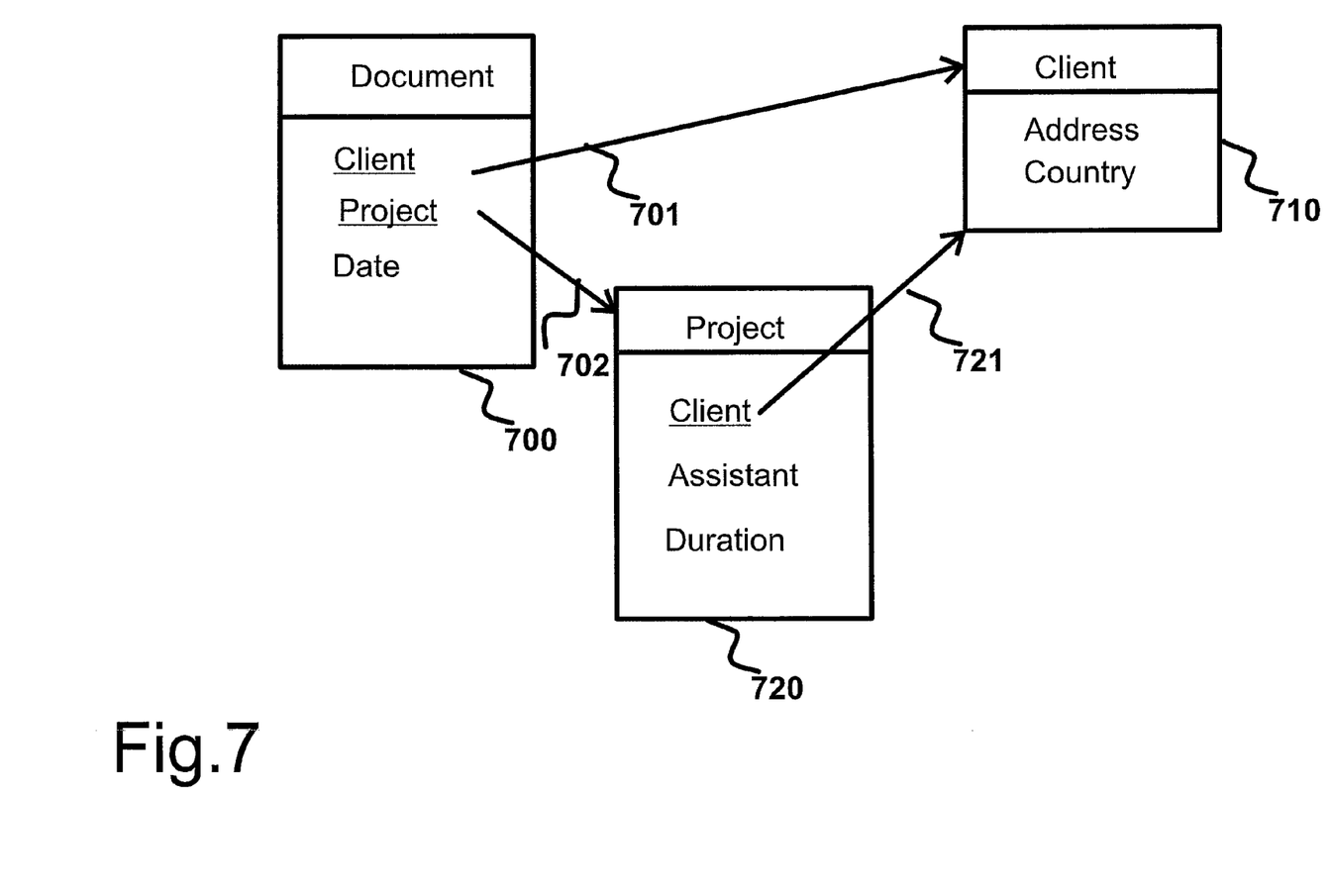
FIG. 7 illustrates an example of the indirect reference further.

To put it practice, FIG. 7 is illustrated. In FIG. 7, object 700 is a document having metadata for Client, Project and Date. The values of them are not mentioned nor shown. The Client is also an object, and therefore it can be used for indirect reference 701. Via client 710, metadata Address and Country are available (e.g. "Client.Country"). Object's 700 metadata Project is also an object and therefore it can be used for indirect reference 702. Via Project 720, metadata Client, Assistant and Duration are available (e.g. "Project.Client.Country"). Because in this example values of metadata do not matter, the Client property of an Project 720 refers to same Client object 710 as the Document's Client property. This is not, however, always the case. The values of the metadata can lead the reference to elsewhere. The purpose of the present FIG. 7 is therefore to easily show, how the reference paths are indirectly formed.

In the previous, examples of the present solution has been discussed. In the solution virtual folders are formed by means of indirect metadata. The solution has been disclosed by means of different examples and figures showing views in an example of user interface of the system. The related discussion has mentioned examples for user interaction (typing, selection from a drop-down menu). It is appreciated that these are not the only examples and they cover other ways for interacting with the system.

Further, the skilled person will appreciate that the detailed description has been given for better understanding of the invention, and some of the features (e.g. system configuration) may vary depending on the possible other functionalities that are incorporated with the document management system.

What is claimed is:

1. A method for a computer system storing electronic objects, the electronic objects being defined by metadata having at least one property, wherein the method comprises receiving a search query from the computer system for at least one retrievable electronic object, said search query comprising a reference path and a search term;

determining whether the reference path between a retrievable electronic object and a search term is complied, the determination comprising starting from a first reference in the reference path and having all electronic objects under determination:

a) considering a reference as a property for an electronic object whose value defines one or more electronic objects;

b) determining which electronic objects from the electronic objects under determination has such property;

c) using the values of such property to find next electronic objects d) if said reference is not a second-last reference in the reference path, replacing the electronic objects under determination with the found electronic objects, and moving forward to next reference processing, continuing from step a);

e) if said reference is the second-last reference in the reference path, taking each found electronic object, and moving forward to last reference processing, continuing from step f);

f) determining which found electronic objects has a property corresponding the last reference and whether the property has a value corresponding to the search term;

retrieving such electronic objects.

2. The method according to claim 1, wherein electronic objects are retrieved as a response to query of electronic objects.

3. The method according to claim 1, further comprising utilizing the retrieved electronic objects for navigation in a virtual space.

4. The method according to claim 1, further comprising forming virtual folders for retrieved electronic objects.

5. A computer system configured to store electronic objects, the electronic objects being defined by metadata having at least one property, wherein the computer system comprises at least receiving means for receiving a search query for at least one retrievable electronic object, said search query comprising a reference path and a search term;

determining means for determining whether the reference path between a retrievable electronic object and a search term is complied, the determining means being configured to perform starting from a first reference in the reference path and having all electronic objects under determination:

a) considering a reference as a property for an electronic object whose value defines one or more electronic objects;

b) determining which electronic objects from the electronic objects under determination has such property;

c) using the values of such property to find next electronic objects
d) if said reference is not a second-last reference in the reference path, replacing the electronic objects under determination with the found electronic objects, and moving forward to next reference processing, continuing from step a);
e) if said reference is the second-last reference in the reference path, taking each found electronic object, and moving forward to last reference processing, continuing from step f);
f) determining which found electronic objects has a property corresponding the last reference and whether the property has a value corresponding to the search term;

retrieving means for retrieving such electronic objects.

6. The computer system according to claim 5, wherein the retrieving means are configured to retrieve electronic objects as a response to query of electronic objects.

7. The computer system according to claim 6, being configured to utilize the retrieved electronic objects for navigation in a virtual space.

8. The computer system according to claim 5, further comprising forming means for virtual folders for retrieved electronic objects.

9. A non-transitory computer readable medium for a computer system storing electronic objects, the electronic objects being defined by metadata having at least one property, wherein the non-transitory computer readable medium comprises computer program instructions stored thereon, wherein said instructions when executed are for receiving a search query for at least one retrievable electronic object, said search query comprising a reference path and a search term;
determining whether the reference path between a retrievable electronic object and a search term is complied, the determination comprising
starting from a first reference in the reference path and having all electronic objects under determination:
a) considering a reference as a property for an electronic object whose value defines one or more electronic objects;
b) determining which electronic objects from the electronic objects under determination has such property;
c) using the values of such property to find next electronic objects
d) if said reference is not a second-last reference in the reference path, replacing the electronic objects under determination with the found electronic objects, and moving forward to next reference processing, continuing from step a);
e) if said reference is the second-last reference in the reference path, taking each found electronic object, and moving forward to last reference processing, continuing from step f);
f) determining which found electronic objects has a property corresponding the last reference and whether the metadata has a value corresponding the search term;

retrieving such electronic objects.

10. A computer system comprising:

a processor, memory including computer program code, the memory and the computer program code configured to, with the processor, cause the computer system at least to perform:

storing electronic objects, the electronic objects being defined by metadata having at least one property; and
receiving a search query for at least one retrievable electronic object, said search query comprising a reference path and a search term;
determining whether the reference path between a retrievable electronic object and a search term is complied, the determination comprising
starting from a first reference and having all electronic objects under determination:
a) considering a reference as a property for an electronic object whose value is one or more electronic objects;
b) determining which electronic objects from the electronic objects under determination has such property;
c) using the values of such property to find next electronic objects
d) if said reference is not a second-last reference in the reference path, replacing the electronic objects under determination with the found electronic objects, and moving forward to next reference processing, continuing from step a);
e) if said reference is the second-last reference in the reference path, taking each found electronic object, and moving forward to last reference processing, continuing from step f);
f) determining which found electronic objects has a property corresponding the last reference and whether the property has a value corresponding to the search term;

retrieving such electronic objects.

11. The computer system according to claim 10, wherein the retrieving electronic objects is performed as a response to query of electronic objects.

12. The computer system according to claim 10, further utilizing the retrieved electronic objects for navigation in a virtual space.

13. The computer system according to claim 10, further forming virtual folders for retrieved electronic objects.

* * * * *